(12) United States Patent
Höfken et al.

(10) Patent No.: US 12,017,193 B2
(45) Date of Patent: Jun. 25, 2024

(54) PROPELLER AND STIRRER FOR CIRCULATING WASTEWATER IN A CLARIFIER

(71) Applicant: INVENT Umwelt-und Verfahrenstechnik AG, Erlangen (DE)

(72) Inventors: Marcus Höfken, Erlangen (DE); Thomas Hagspiel, Postbauer-Heng (DE)

(73) Assignee: INVENT Umwelt-und Verfahrenstechnik AG, Erlangen (DE)

( * ) Notice: Subject to any disclaimer, the term of this patent is extended or adjusted under 35 U.S.C. 154(b) by 509 days.

(21) Appl. No.: 17/272,604

(22) PCT Filed: Apr. 29, 2020

(86) PCT No.: PCT/EP2020/061863
§ 371 (c)(1),
(2) Date: Mar. 1, 2021

(87) PCT Pub. No.: WO2020/225049
PCT Pub. Date: Nov. 12, 2020

(65) Prior Publication Data
US 2022/0016586 A1  Jan. 20, 2022

(30) Foreign Application Priority Data
May 3, 2019  (DE) .......................... 102019111492.6

(51) Int. Cl.
*B01F 27/07* (2022.01)
*B01F 27/113* (2022.01)
(Continued)

(52) U.S. Cl.
CPC .......... *B01F 27/071* (2022.01); *B01F 27/113* (2022.01); *B01F 27/71* (2022.01); *C02F 1/00* (2013.01); *B01F 2101/305* (2022.01)

(58) Field of Classification Search
CPC ...... B01F 27/071; B01F 27/113; B01F 27/71; B01F 2101/305; B01F 27/91;
(Continued)

(56) References Cited

U.S. PATENT DOCUMENTS 888,199 A * 5/1908 Stafford ................ B01F 27/071
366/67
1,555,964 A * 10/1925 Guedel ............... B02C 13/2804
366/66
(Continued)

FOREIGN PATENT DOCUMENTS

DE  29803497 U1  6/1999
DE  102013225658 A1  6/2015
(Continued)

OTHER PUBLICATIONS

Krasenbrink, B.; International Search Report; PCT/EP2020/061863; dated Sep. 2, 2020; 4 pages.

*Primary Examiner* — Charles Cooley
(74) *Attorney, Agent, or Firm* — Bradley Arant Boult Cummings LLP

(57) ABSTRACT

A propeller fastened to a shaft in a clamping manner, the shaft having a driver profile extending in the axial direction, wherein: the propeller is formed from multiple elements, each element (having a hub portion with a counter profile corresponding to the driver profile; a first connection portion and a propeller blade extending from the first connection portion are formed on one side of the hub portion, and a second connection portion is formed on the opposite other side of the hub portion; the first connection portion is designed to bear interlockingly against a further second connection portion of an adjacent further element; and, when the elements are connected such that their connection portions bear against one another, the hub portions of all the (Continued)

Figure 1:
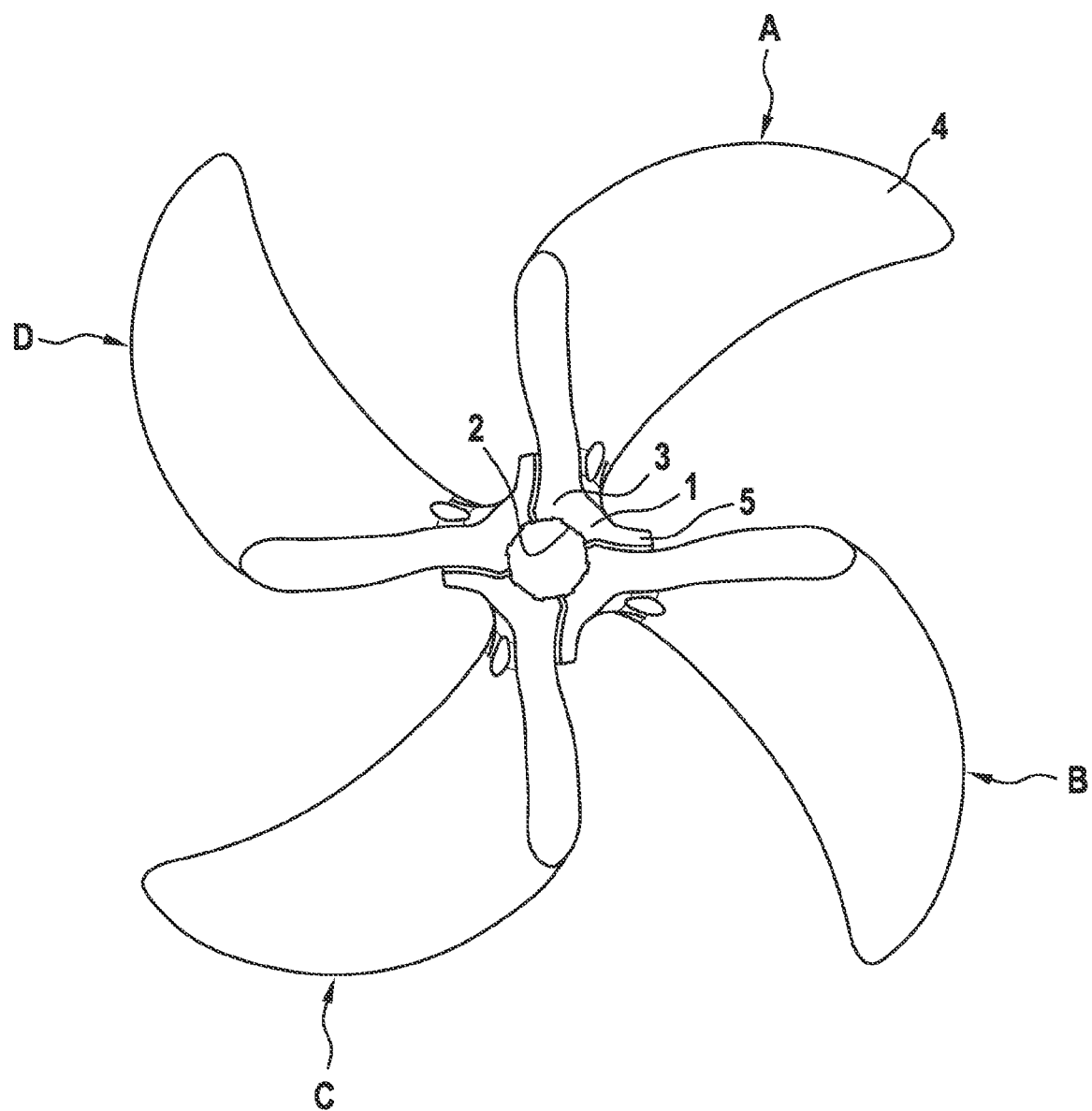

elements complement one another to form a hub surrounding the shaft in an interlocking manner.

10 Claims, 4 Drawing Sheets

(51) Int. Cl.
  *B01F 27/71* (2022.01)
  *B01F 101/00* (2022.01)
  *C02F 1/00* (2023.01)
(58) Field of Classification Search
  CPC ...... B01F 35/3204; C02F 1/00; C02F 3/1284; C02F 2001/007; Y02W 10/10
  USPC ............................................ 366/330.1–330.7
  See application file for complete search history.

(56) References Cited

U.S. PATENT DOCUMENTS

| | | | | |
|---|---|---|---|---|
| 1,687,660 A * | 10/1928 | Cummer | ............... | E01C 19/104 366/66 |
| 1,712,549 A * | 5/1929 | Castellano | ............ | E01C 19/185 366/65 |
| 1,741,013 A * | 12/1929 | Cummer | ............... | E01C 19/104 366/66 |
| 1,917,867 A * | 7/1933 | Barker | ................... | D06F 13/00 366/276 |
| 2,636,720 A * | 4/1953 | Forrest | ................. | F16D 1/0864 416/207 |
| 2,869,840 A * | 1/1959 | Schmidt | ................ | B01F 27/112 366/331 |
| 3,160,249 A | 12/1964 | Pavlecka | | |
| 3,614,262 A * | 10/1971 | Lutz | ..................... | B01F 27/052 366/195 |
| 3,738,774 A * | 6/1973 | Lutz | ..................... | E01C 19/104 416/222 |
| 4,285,637 A * | 8/1981 | Thompson | .............. | B64C 11/06 416/61 |
| 4,304,494 A * | 12/1981 | Lutz | ..................... | B01F 27/052 416/224 |
| 4,456,382 A * | 6/1984 | Mahler, II | ............. | B01F 27/071 366/276 |
| 4,721,394 A * | 1/1988 | Casto | ................... | B01F 27/113 416/243 |
| 4,722,608 A * | 2/1988 | Salzman | ............. | B01F 27/1132 366/279 |
| 4,988,303 A * | 1/1991 | Thomas | ................ | B01F 27/071 366/326.1 |
| 5,046,245 A * | 9/1991 | Weetman | ................ | B01F 35/10 29/889 |
| 5,152,606 A * | 10/1992 | Borraccia | ............. | B01F 27/071 416/207 |
| 5,385,448 A * | 1/1995 | Merkt | ................... | B01F 27/071 416/241 A |
| 5,524,982 A * | 6/1996 | Kruse | ................... | B01F 27/071 366/288 |
| 9,878,295 B2 * | 1/2018 | Marshall | ................ | C12M 27/02 |
| 2004/0145966 A1* | 7/2004 | Kar | ...................... | B01F 27/1123 366/329.1 |
| 2009/0127213 A1* | 5/2009 | Hoefken | ............... | C02F 3/1284 210/150 |
| 2013/0003495 A1* | 1/2013 | Pyddoke | ............... | B01F 27/113 366/343 |
| 2016/0289622 A1* | 10/2016 | Czwaluk | ............... | C12M 27/02 |
| 2016/0296897 A1* | 10/2016 | Marshall | ................ | C12M 27/02 |
| 2016/0339401 A1* | 11/2016 | Hoefken | ............... | B01F 27/117 |
| 2017/0001156 A1* | 1/2017 | Hoefken | ............... | B21D 53/267 |
| 2017/0021313 A1* | 1/2017 | Hoefken | ............... | B01F 27/071 |
| 2022/0016586 A1* | 1/2022 | Höfken | ................ | C02F 3/1284 |

FOREIGN PATENT DOCUMENTS

| | | | |
|---|---|---|---|
| EP | 0582856 A1 | 2/1994 | |
| EP | 3287356 A1 | 2/2018 | |
| SU | 1694194 A1 * | 11/1991 | ............... B01F 7/001 |
| WO | WO-2006108538 A1 | 10/2006 | |
| WO | WO-2009018916 A1 | 2/2009 | |
| WO | WO-2017108255 A1 | 6/2017 | |

* cited by examiner

PROPELLER AND STIRRER FOR CIRCULATING WASTEWATER IN A CLARIFIER

The invention relates to a propeller and to an agitator for circulating wastewater in a clarifier.

Propellers are generally known in the prior art. They are used to circulate fluids and the like, in particular to drive ships. A propeller usually comprises a hub for fastening to a propeller shaft. The hub may be fabricated in one piece with the propeller. In addition, propellers with adjustable propeller blades are also known. The adjustable propeller blades are fastened to the hub.

Propellers are used, inter alia, also in what are known as hyperboloid agitators for the circulation of wastewater. In this case, the propeller is mounted on the shaft above a hyperboloid agitator body. The wastewater is accelerated in the direction of the hyperboloid agitator body by means of the propeller. Such an agitation apparatus is known for example from WO 2009/018916 A1.

Propellers which are produced in one piece with the hub have a large transport volume. Apart from this, it is sometimes a laborious process to install propellers on a shaft if, at the end of the shaft, there is already an agitator body mounted, for example a hyperboloid agitator body.

The object of the invention is to overcome the disadvantages according to the prior art. In particular, a propeller will be described which has a small transport volume. In accordance with a further objective of the invention, the propeller should be suitable for installation on a shaft even if there is already an agitator body, propeller or the like mounted on the end of the shaft. Apart from this, an agitation apparatus which is able to be installed with reduced effort will be described.

This object is achieved by the features of claims 1 and 7. Expedient embodiments of the invention will become clear from the dependent claims.

In accordance with the invention, a propeller to be secured by damping to a shaft having a driver profile extending in the axial direction is proposed,
wherein the propeller is formed from a number of elements,
wherein each element has a hub portion with a mating profile corresponding to the driver profile,
wherein a first connection portion and a propeller blade extending from the first connection portion are moulded on one side of the hub portion, and a second connection portion is moulded on the opposite, other side of the hub portion,
wherein the first connection portion is designed to bear interlockingly against a further, second connection portion of an adjacent further element, and
wherein, when the elements bearing against one another by their connection portions are connected, the hub portions of all elements together form a hub that surrounds the shaft interlockingly.

Since the proposed propeller is formed from a number of elements, the transport volume of the propeller may be reduced. The proposed propeller in particular is then suitable for assembly on a shaft even if the end of the shaft is already provided with an agitator body, propeller or the like. Since the hub portions of all elements together form a hub that surrounds the shaft interlockingly, an interlocking and clamping connection with the shaft may be achieved. The first connection portion is designed to bear interlockingly against a further, second connection portion of an adjacent further element. The elements or connection portions thereof are expediently designed such that, when installed, a narrow gap remains between the first connection portion and the adjacent, further, second connection portion. Besides the interlocking connection to the shaft, this additionally allows a frictionally engaged or clamping connection. The connection demonstrates an excellent level of strength.

A thin plate made of an elastic material, for example rubber or the like, may be mounted on the first and/or second connection portion. The plate, when installed, closes a gap formed between the first connection portion and the adjacent, further, second connection portion. This prevents thread-like contaminants from becoming trapped in the gap.

The shaft is preferably a splined shaft. Of course, it is also conceivable that the shaft has a different driver profile extending in the axial direction. For example, the shaft may have a polygonal profile, toothed-shaft profile, a serrated-shaft profile, and the like. In this case, the hub portion may have a corresponding mating profile accordingly.

In accordance with an advantageous embodiment, the propeller is formed from at least three elements, preferably from precisely four elements. The elements may be identical. This reduces the production costs of the propeller.

The first connection portion expediently has at least two first apertures. The first apertures may be formed as threaded bores. The second connection portion may have at least two second apertures, corresponding to the first apertures, for the passage of screws. This enables a simple and rapid connection of the elements.

In accordance with a further provision of the invention, an agitation apparatus for circulating wastewater in a clarifier is proposed, comprising a motor and a shaft extending therefrom with a driver profile extending in the axial direction, wherein a propeller according to the invention is mounted on the shaft. The proposed agitation apparatus is able to be installed quickly and easily. In particular, it is possible to install the propeller according to the invention even if a further propeller, hyperboloid agitator body or the like is already mounted on the end of the shaft.

Again, the shaft expediently may be a splined shaft. The agitation apparatus may be a hyperboloid agitator. In this case, a hyperboloid agitator body is expediently mounted on the end of the shaft extending hanging from the motor. Such an agitation apparatus is able to be installed particularly easily with use of the propeller according to the invention.

Figure 2:
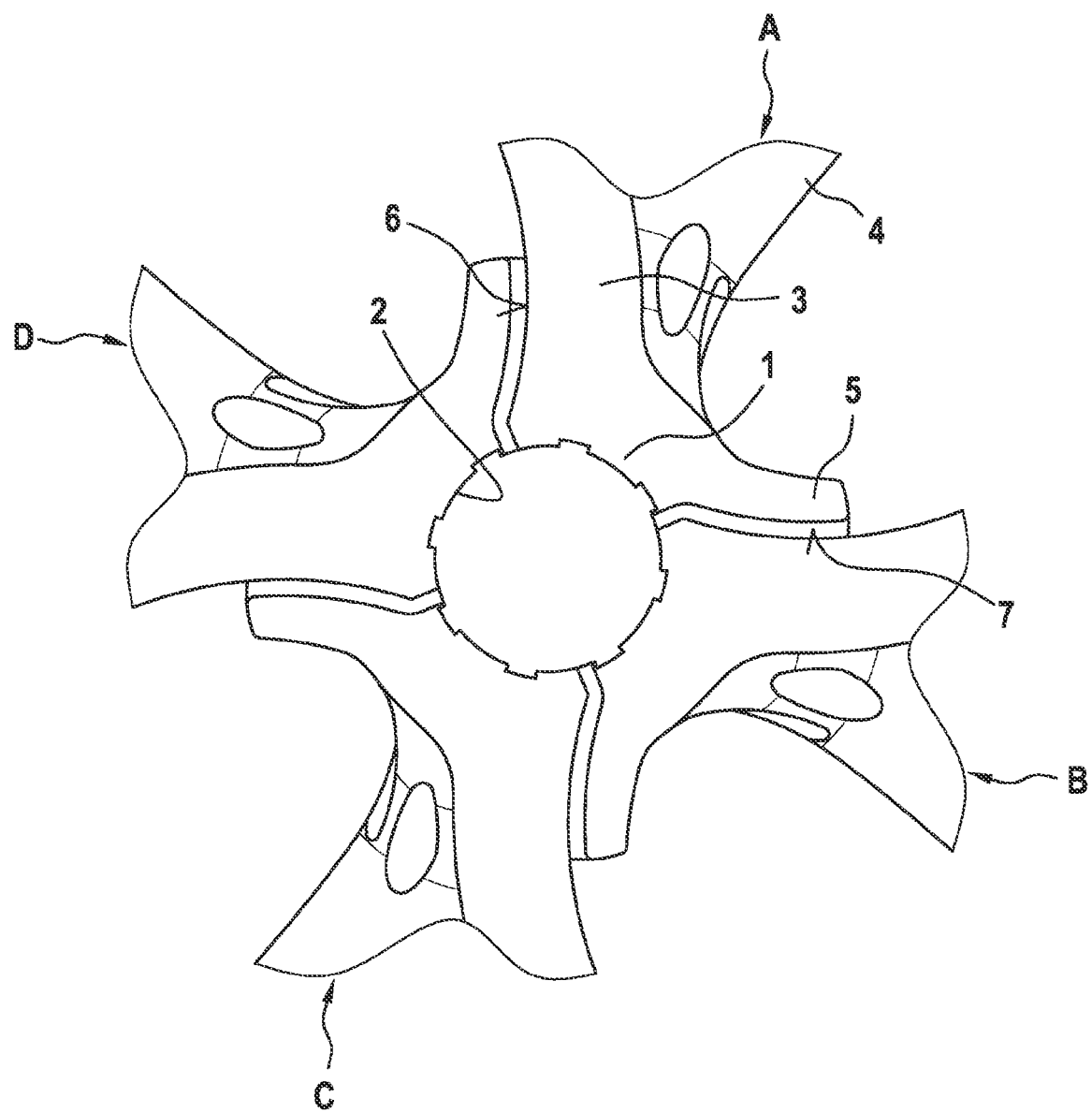
Figure 3:
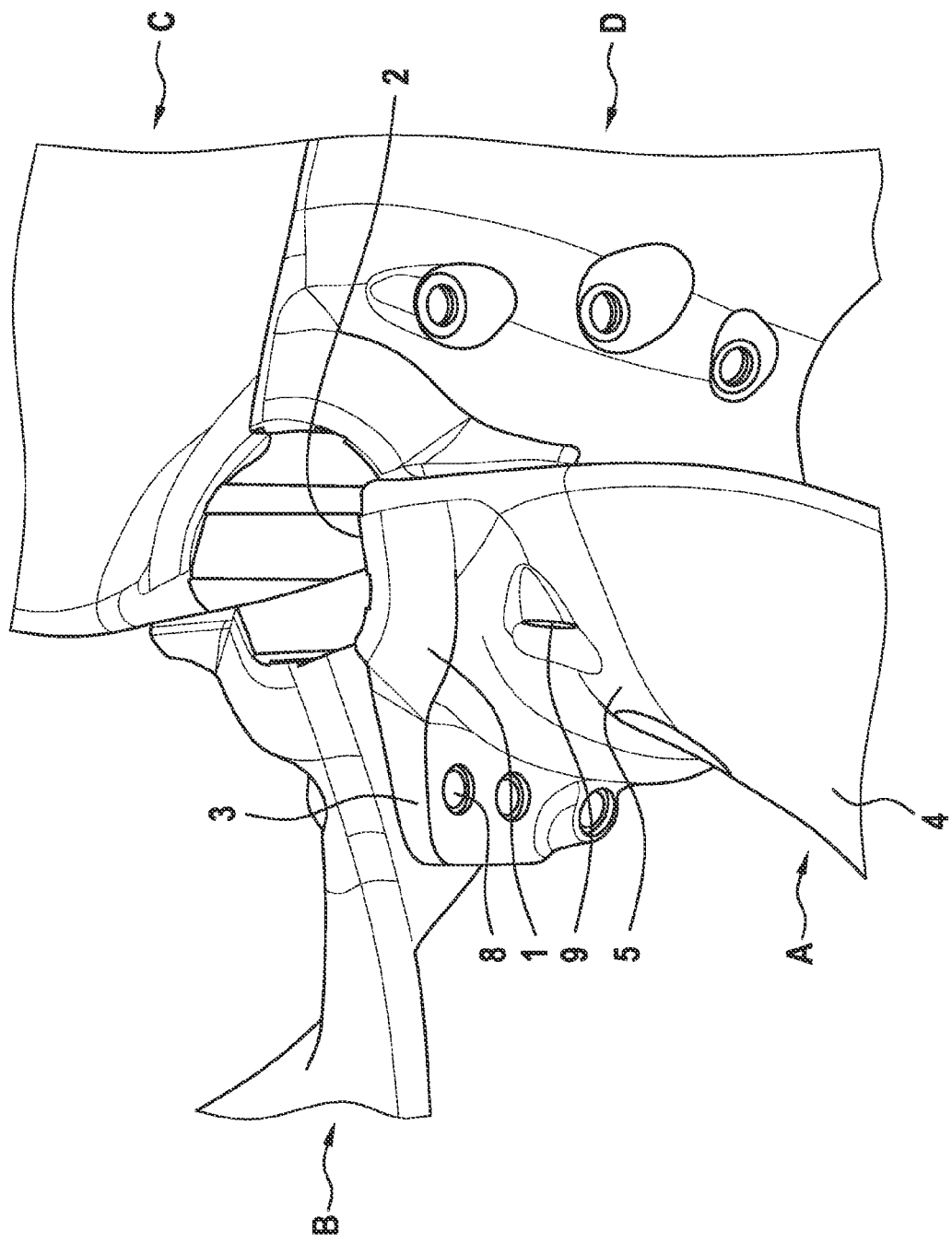
Figure 4:
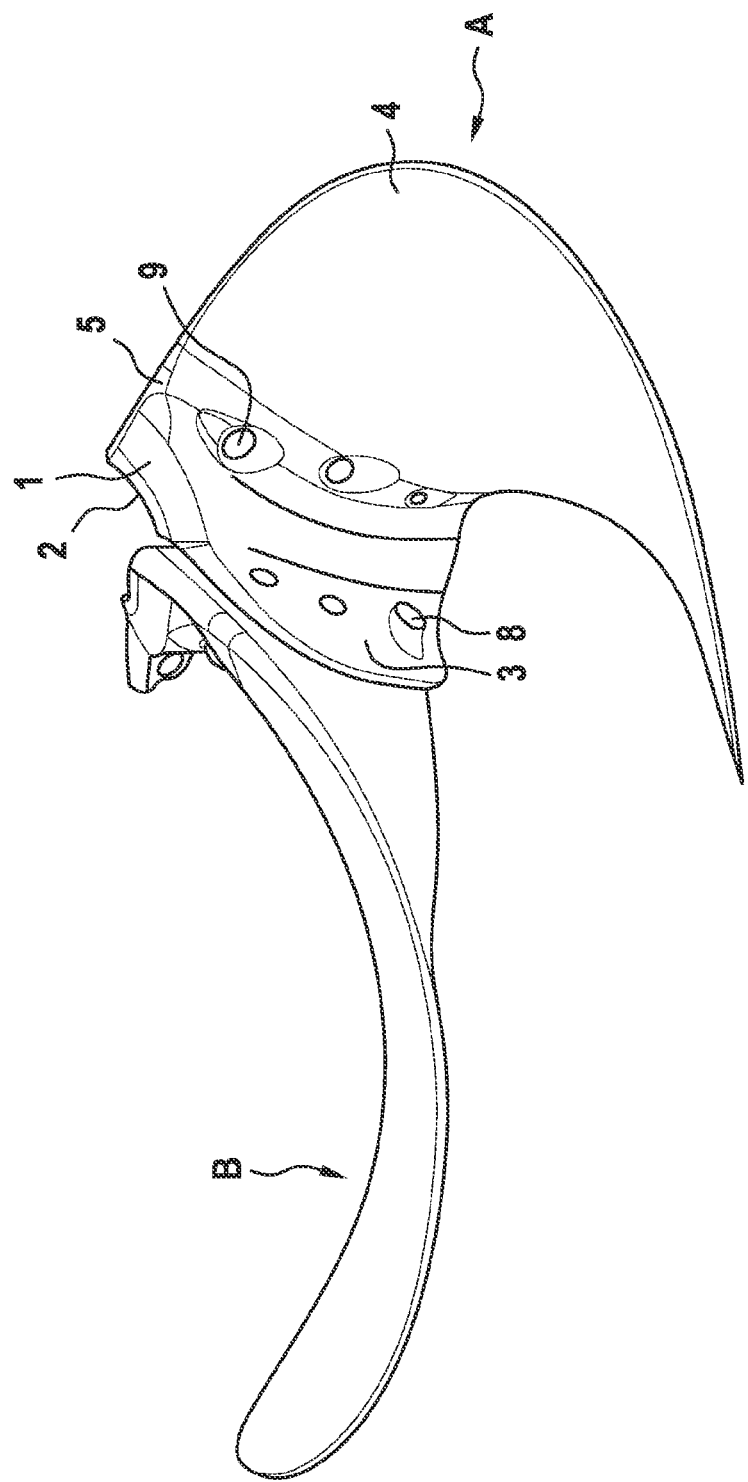

An exemplary embodiment of the propeller will be explained in greater detail hereinafter with reference to the drawings, in which:

FIG. 1 shows a plan view of a propeller;
FIG. 2 shows an enlarged detail according to FIG. 1;
FIG. 3 shows a perspective view according to FIG. 2; and
FIG. 4 shows a perspective view of two elements bearing against one another.

The propeller shown in the drawings is produced from a number of elements A, B, C and D formed in one piece. In the present exemplary embodiment the propeller is formed from precisely four elements A, B, C and D. The elements A, B, C and D may be identical. The propeller will be described hereinafter in greater detail with reference to the element A. The description below applies equally for the other elements B, C and D.

The element A has a hub portion 1, the inner circumference of which is provided with a mating profile 2. The mating profile 2 corresponds to a driver profile (not shown here) of a splined shaft (not shown here). A first connection portion 3 extends from the hub portion 1 at an angle, here at an angle of approximately 45 degrees. A propeller blade 4, preferably precisely one propeller blade 4, extends from the first connection portion 3. A second connection portion 5 is moulded on the other side of the hub portion 1. The second connection portion 5 forms an angle of approximately 90 degrees with the first connection portion 3. It is clear that the angle between the first connection portion 3 and the second connection portion 5 will change if the proposed propeller is formed not from four elements, but from three, five or more elements.

The first connection portion 3 has a first bearing face 6 in the circumferential direction. The second connection portion 5 has a second bearing face 7 in the circumferential direction. The first bearing face 6 and the second bearing face 7 are formed correspondingly, such that the first connection portion 3 and the second connection portion 5 may be placed against one another substantially interlockingly (see FIG. 2).

As can be seen in particular from FIGS. 3 and 4, the first connection portion 3 has first apertures 8. The second connection portion 5 has second apertures 9. When adjacent elements A, B, C and D are arranged bearing against one another, the first apertures 8 and the second apertures 9 are arranged opposite one another, such that fastening bolts may be guided through the first apertures 8 and the second apertures 9. In this case, the first apertures 8 are expediently embodied as threaded bores.

In order to install the proposed propeller, it is merely necessary to position the elements A, B, C and D around the shaft (not shown here) and then to connect them to one another by means of screws. The hub portions together form a hub when the elements A, B, C and D are connected, said hub engaging interlockingly in the driver profile 2 of the shaft by means of the mating profile 2. Apart from this, the elements A, B, C and D are formed such that, when connected, they surround the shaft in a frictionally engaged or clamping fashion.

The propeller according to the invention may be installed in particular relatively easily on a shaft having a hyperboloid agitator body mounted to its end. In this regard, reference is made by way of example to WO 2009/018916 A1, WO 2006/108538 A1 and DE 298 03 497 U1.

The invention claimed is:

1. A propeller to be secured by clamping to a shaft having a driver profile extending in an axial direction, the propeller comprising:
    a plurality of identical elements;
    wherein each identical element of the plurality of identical elements has a hub portion with a mating profile corresponding to the driver profile;
    wherein a first connection portion and a propeller blade extending from the first connection portion are molded on one side of the hub portion and a second connection portion is molded on an opposite other side of the hub portion;
    wherein the first connection portion is designed to bear interlockingly against a second connection portion of an adjacent identical element of the plurality of identical elements;
    wherein, when the plurality of identical elements bearing against one another by their connection portions are connected, the hub portions of all of the plurality of identical elements together form a hub that surrounds the shaft interlockingly; and
    wherein the first connection portion has at least two first apertures.

2. The propeller according to claim 1, wherein the shaft is a splined shaft.

3. The propeller according to claim 1, wherein the propeller is formed from at least three identical elements.

4. The propeller according to claim 3, wherein the propeller is formed from four identical elements.

5. The propeller according to claim 1, wherein the first apertures are formed as threaded bores.

6. The propeller according to claim 1, wherein the second connection portion has at least two second apertures, corresponding to the first apertures, for passage of screws.

7. An agitation apparatus for circulating wastewater in a clarifier, the agitation apparatus comprising a motor and a shaft extending therefrom with a driver profile extending in the axial direction, wherein a propeller according to claim 1 is mounted on the shaft.

8. The agitation apparatus according to claim 7, wherein the shaft is a splined shaft.

9. The agitation apparatus according to claim 7, wherein a hyperboloid agitator body is mounted on an end of the shaft extending hanging from the motor.

10. The propeller according to claim 1, wherein each of the plurality of identical elements is molded in one piece.

* * * * *